M. R. WOLFARD.
INTERNAL COMBUSTION ENGINE.
APPLICATION FILED MAR. 22, 1916.

1,389,337.

Patented Aug. 30, 1921.
4 SHEETS—SHEET 1.

WITNESSES
Anna B. Lindsay
Marion Grace

INVENTOR
MERL R. WOLFARD
BY
Mitchell, Chadwick & Kent
ATTYS.

M. R. WOLFARD.
INTERNAL COMBUSTION ENGINE.
APPLICATION FILED MAR. 22, 1916.

1,389,337.

Patented Aug. 30, 1921.
4 SHEETS—SHEET 2.

WITNESSES

INVENTOR
MERL R. WOLFARD
BY
Mitchell, Chadwick & Kent
ATTYS.

M. R. WULFARD.
INTERNAL COMBUSTION ENGINE.
APPLICATION FILED MAR. 22, 1916.
1,389,337.
Patented Aug. 30, 1921.
4 SHEETS—SHEET 3.
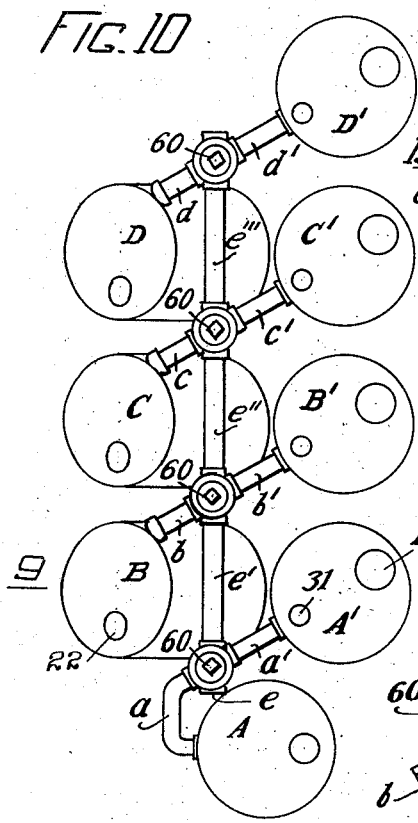
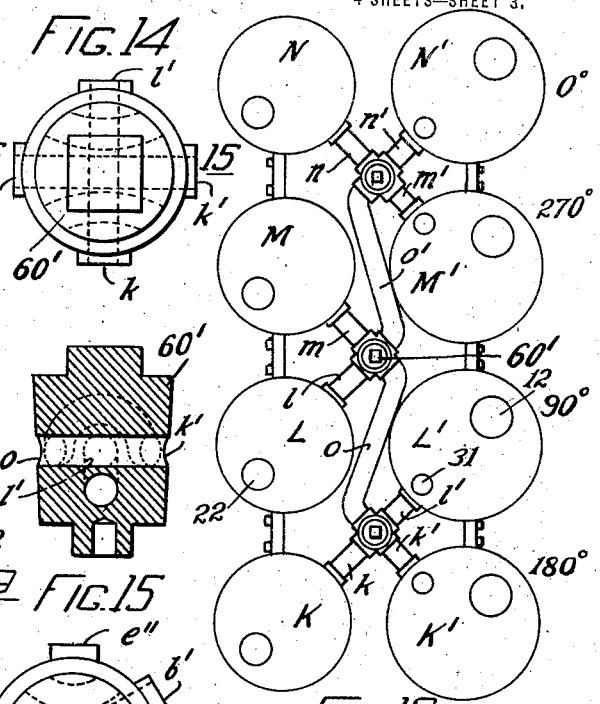
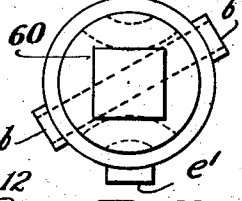
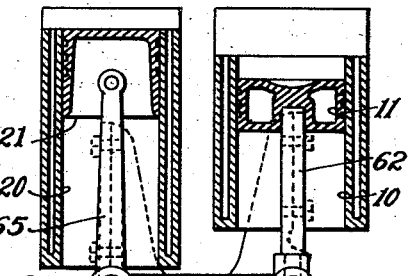
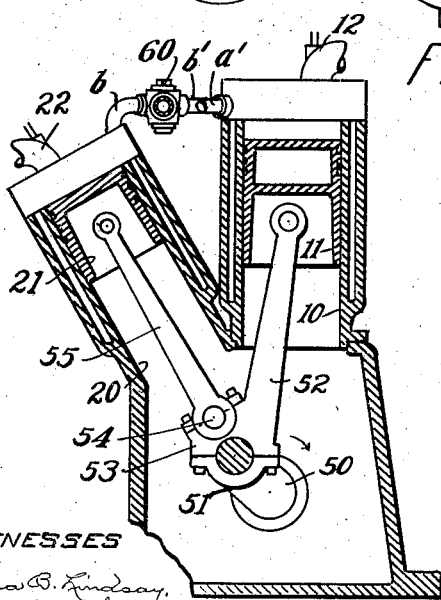
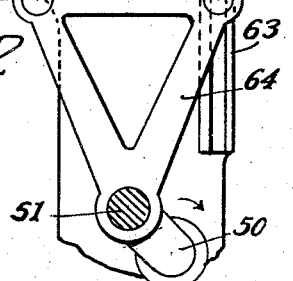
INVENTOR
MERL R. WOLFARD
BY
Mitchell, Chadwick & Kent
ATT'YS.

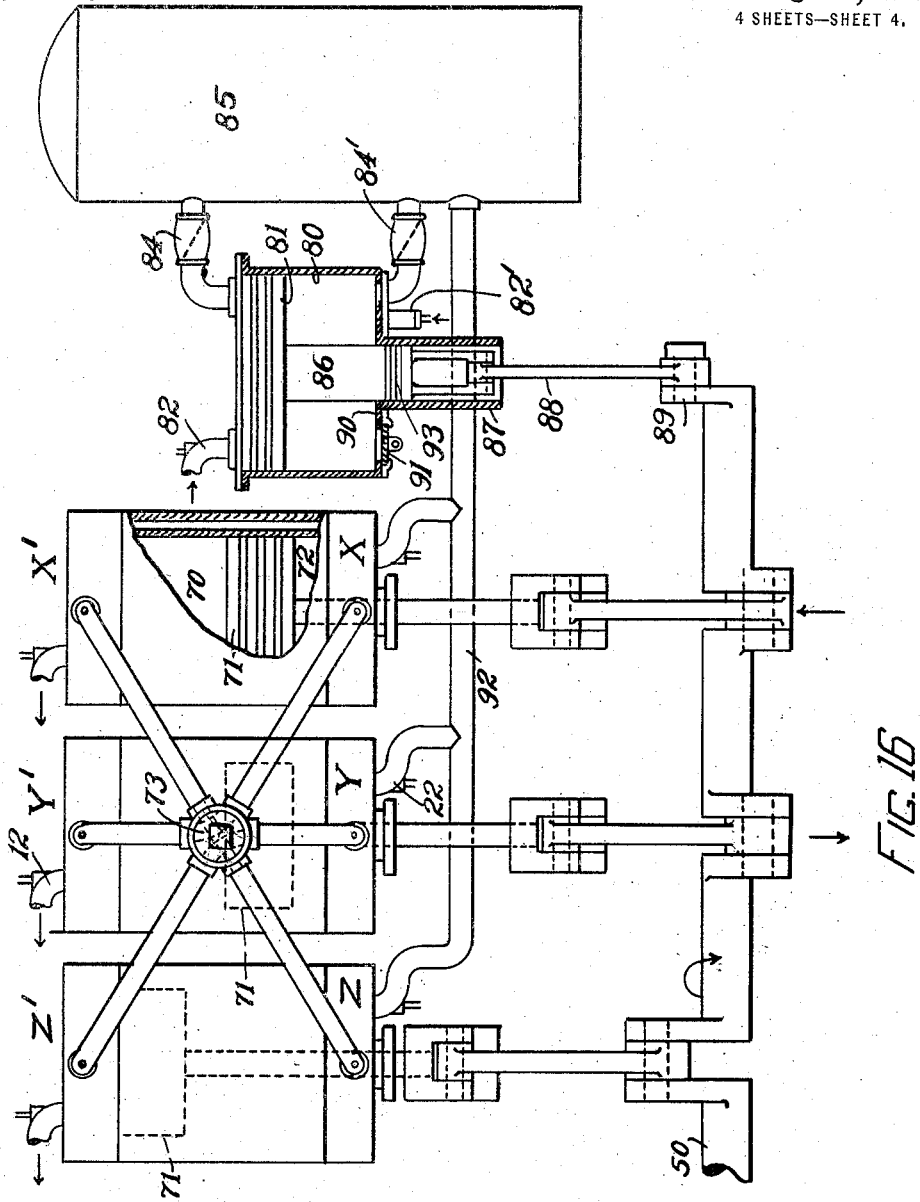

UNITED STATES PATENT OFFICE.

MERL R. WOLFARD, OF CAMBRIDGE, MASSACHUSETTS.

INTERNAL-COMBUSTION ENGINE.

1,389,337.   Specification of Letters Patent.   Patented Aug. 30, 1921.

Application filed March 22, 1916. Serial No. 85,758.

*To all whom it may concern:*

Be it known that I, MERL R. WOLFARD, a citizen of the United States, residing at Cambridge, in the county of Middlesex and State of Massachusetts, have invented new and useful Improvements in Internal-Combustion Engines, of which the following is a specification.

This invention relates to improvements in internal combustion engines. More particularly it relates to engines of the type illustrated in my pending application Serial No. 8828 in which a power cylinder and an air cylinder are joined by a passage, and their pistons are connected to the same shaft; and in which the air piston lagging some 45°, behind the power piston begins to force air through the passage and other mechanism begins to force oil fuel into the passage at about the time the power piston is at its inner limit of travel, the oil and air being thoroughly intermingled immediately upon the introduction of the oil, with the result that combustion occurs progressively during the flow of contents toward and into the power cylinder. In my said pending application I have shown the two cylinders close together, which closeness is advantageous in preventing heat losses from the freshly compressed air. The passage connecting the two cylinders leads from one to the nearest part of the other, with the result that the column of flaming contents flows over and more or less impinges upon a marginal part of the face of the piston head. One object of the present invention is to provide an improvement in this respect; and this is accomplished by introducing the flaming products into the middle of the head part of the power cylinder, so that such impinging as does occur is against the middle of the piston head. Stresses resulting from the heat are thus more uniformly distributed. Also, a different shape of combustion passage thus becomes possible, and is another feature of the invention; and with this I may combine a novel type of fuel spraying nozzle different from that shown in my said pending application, one which can be placed at a smaller average distance from the air which is to be loaded with fuel for combustion, a matter which is especially important for engines of large capacity.

In my said pending application I have pointed out that a column of flaming products cannot be abruptly deflected without danger of rapid deterioration of the walls which deflect it. The improved passage is so constructed that beyond the point of the fuel introduction it is not contracted on any diameter; and its angle of entrance into the power cylinder is such as to reduce to a minimum the tendency for hot products to impinge against any wall of the combustion chamber. One factor especially contributing to this reduction of tendency is the large cross-sectional area of the passage at the plane of its junction with the power cylinder, as compared with its cross-sectional area at the point of fuel introduction.

An engine of the said type in which a lagging air piston forces air through a combustion passage into the power cylinder is not directly reversible, because upon reversal of rotation the air piston becomes leading instead of lagging. The invention comprises means to make such an engine easily reversible. This object is accomplished by the use of crossed or forked passages with valves.

In either of the above cases it may be desirable to make the passages of somewhat extended lengths. Other features of the invention provide for maintaining the pressure of air in such a passage at any desired degree below the maximum, so that air that has once been compressed and forced into the passage by the air piston does not lose its energy. To let it expand through the power cylinder without combustion would mean loss when the exhaust valve opens, particularly if the portion of air be considerable as when the passage between the cylinders is long, with the controlled intermediate valve located near the air cylinder, and with fuel introduced near the power cylinder as is preferable. To let it re-expand into the air cylinder might also be objectionable because then the air cylinder and all its operating mechanism must be made larger. The division of the passage, by placing the intermediate valve in its midst next to the fuel injector, that injector being at the proper distance from the power cylinder for the beginning of a well designed combustion passage, cures the former evil; the placing of a check valve between the air passage and the air cylinder remedies the latter. Whether it be preferred to employ such a check valve, or to provide a somewhat larger air cylinder to take care of the re-expansion, there is another feature which contributes to efficiency, viz., the enveloping of the air passage with exhaust gases. The idea is not so much one of heat regeneration by transference of heat from the exhaust gases to the fresh air, which would require a considerable surface to be effective, but is rather the equalization of temperature of inflowing air throughout a cycle, insuring vaporization and quick and complete combustion of the oil that is admitted first in each cycle, by preventing loss of heat of compression from the air that is to vaporize it, or even by adding to its temperature resulting from its compression, which compression and temperature are relatively low owing to the air piston not being near its head end of stroke. In the case of the most difficultly volatilizable oil fuels this feature may be found of great importance; and in those types of the engine where the passage is relatively long, which length would ordinarily be counted a disadvantage, this feature may result in so utilizing that length of passage as actually to improve the performance of the engine.

Another feature adapted to conserve energy by reducing friction losses and conserving heat, consists in providing means to drive the air piston without a separate crank and bearings on the main shaft by attaching it to the connecting rod of the power piston. The invention also provides means, by a suitable offsetting of the cylinders from the plane passing through the crank shaft, to materially shorten what would otherwise be the necessary length of air passage between them.

The above and other features of the invention facilitate compact design of durable and efficient horizontal and inclined engines of the general type set forth, provide for mechanical simplicity and low friction, light weight, reversibility and other practical advantages, some of which are mentioned hereinafter, which are of great importance and whose absence has thus far been a serious limitation on the results attainable with oil engines in naval and commercial marine power plants, as well as in mobile and stationary plants on land.

The invention may be applied in many forms other than those here chosen for illustration, without departing from the scope of the invention as defined in the appended claims. It is intended that the patent shall cover by suitable expression in the appended claims whatever features of patentable novelty exist in the invention disclosed, except matters pertaining to the fuel nozzle which form the subject matter of separate applications for patent Serial Nos. 114,464 and 237,525.

In a preferred embodiment of the invention, the passage connecting the air and power cylinders is divided into two parts, one of which will be designated hereinafter as the combustion end, or simply as the mixing and combustion passage, this being the end part opening into the power cylinder, extending from where the fuel nozzle is located. The other part is designated as the air end of the passage, or simply as the air passage, being the part into which the air cylinder delivers, and which delivers air to the combustion passage. An intermediate valve, the function and construction of which is set forth in my said pending application for patent where that feature is claimed as a check valve and may be placed in any part of the air passage, but preferably is near the oil nozzle. Between the air cylinder and the air passage may be another check valve, preventing the air from returning to the air cylinder. The combustion passage is constructed so as not to diminish on either diameter, beyond the point of fuel introduction, and preferably has diverging walls. The angle of its junction with the power cylinder is such as to reduce to a minimum the tendency of the flaming products to impinge against any wall of the combustion chamber, which chamber includes both the combustion passage and more or less of the head end of the cylinder and piston. In one form of embodiment of the invention this arrangement of passage is supplemented by the provision of a cup or depression in the middle of the piston head. Ordinarily a complete engine will consist of several power cylinders and their associated air cylinders, and these may preferably be so arranged that the crank of each power piston on the main shaft operates one of the air pistons. At the same time the said air and combustion passages connecting the head ends of the cylinders are preferably arranged by connection from an air cylinder to a power cylinder other than that to which its piston is immediately connected, so that the maximum pressure in the air cylinder is not reached at the same time with the maximum pressure in the power cylinder whose piston is connected to the same crank. This enables a relatively light crank to carry both air and power pistons. Valve controlled connection between the air passages of a multi-cylinder engine permits the engine to be reversed, so far as the air supply is concerned, by the mere pulling of a lever; and the arrangements within each passage, together with heating or insulating means that may be placed around it, provide for the conservation of heat and power that would otherwise be lost owing to length of passage.

The advantages of engine construction in which there is action of the working medium on both sides of the piston are well known in connection with steam engines, and various efforts have been made to apply it to internal combustion engines but for several reasons all attempts have hitherto failed, so far as I know, to produce a reliable and industrially valuable double acting oil engine. By the present invention, however, engines can be built which are comparable to "double acting" in that both sides of the pistons are used with consequent elimination of half of the cylinders that would otherwise be necessary. In particular, this is accomplished by compressing air on the crank side and expanding the power medium on the head side of the piston in each cylinder. This type can be made reversible as can other embodiments of the invention. It is herein illustrated in conjunction with still other features of the invention, with which, however, it is not necessarily associated. It is shown as it may be applied to an engine in which three cylinders are set at 120° from each other, and in which the lack of precise conformity to the desired 45° lag of air piston behind power piston is overcome by the use of an auxiliary low pressure air compressing and storing mechanism, which takes little power and has negligible heat losses because it works at such low pressure, but which by supplying the air to the air cylinders under low pressure makes up for their own retarded beginning of the compression of air for their respective power cylinders.

Other features will appear from the more detailed description which follows, showing several different devices in which the invention may be embodied, reference being had to the accompanying drawings, in which—

Fig. 9 is an end elevation of a multi-cylinder engine embodying the invention, with parts broken away to the middle of one of the cylinders in each row, as on the line 9—9 of Fig. 10, being an embodiment in which the cylinders are arranged differently from the forms previously shown, with air and power cylinders set at angles to each other and their pistons connected in pairs, each pair to a single crank;

Fig. 10 is a plan of the engine shown in Fig. 9;

Fig. 11 is a plan of one of the valves shown in Fig. 10 enlarged;

Fig. 12 is an elevation of still a different embodiment of the invention, in which the air and power cylinders are parallel and in adjacent lines, with air and power pistons connected in pairs, each pair to a single crank;

Fig. 13 is a plan of the engine shown in Fig. 12;

Fig. 14 is a plan of one of the valves shown in Fig. 13;

Fig. 15 is an elevation of the plug of one of the valves of Fig. 14 in section on the line 15—15 of Fig. 14;

Fig. 16 is a side elevation of an engine embodying the invention in another form, in which the cylinders are double-acting, one side of the piston being air and the other power, and are set at 120° from each other on the crank shaft, and with other modifications.

Figure 1:
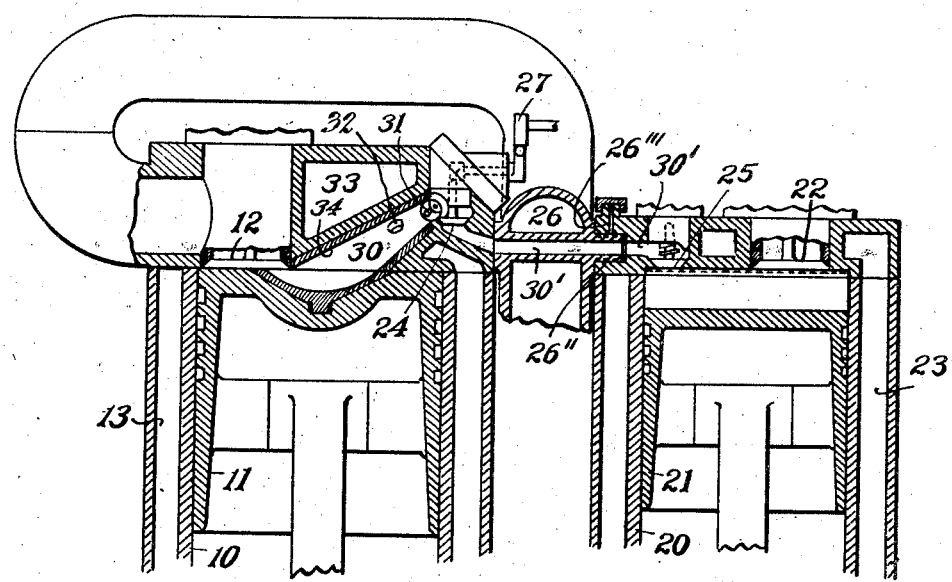
Figure 1 is an elevation in section on a medial plane through the head of a vertical engine embodying the invention.

Referring to the drawings 10 indicates the power cylinder, 11 the power piston, 12 the exhaust valve and 13 the water jacket for the power cylinder. The numeral 20 indicates the air cylinder, 21 the air piston, 22 the air inlet valve, 23 the water jacket for the air cylinder and 24 the intermediate valve which controls the flow of air. The numeral 30 indicates the combustion passage, 31 the fuel inlet nozzle, 32 an ignition device for use while starting and 33 the water jacket which may surround the combustion passage. In the form shown in Fig. 1 the fuel nozzle 31 is located above the power cylinder and at a sufficient distance therefrom so that the combustion passage can lead straight from it to the middle part of the power cylinder head, where the heated gases from the passage are not delivered upon side parts, near the periphery. Either the whole combustion chamber or such parts as need it, including especially the combustion passage and the part of the piston upon which it discharges, may be lined with heat resisting material 34, for which a composition one-third to two-thirds nickel alloyed with iron has been found particularly useful, and forms the subject matter of Letters Patent to me No. 1,263,831. The little space or crack between this and the wall amounts to an insulation which retards flow of heat outward and diffuses the heat generally. The combustion passage extends to the power cylinder, passing around the fuel inlet. Ignition may occur at any point within this passage. The intermediate valve 24 is preferably placed in the air passage near the fuel inlet, and then by properly designing the cylinder and piston 10 and 11 and connected parts, most of the clearance space of the power cylinder will be within said combustion passage. The amplitude of dimensions which thus become possible for said passage, without entailing undue clearance, tends toward effectiveness of combustion of the heavier and less volatile fuel oils, coupled with durability of the combustion chamber walls. As illustrated in Fig. 1 there may also be a valve 25 in the passage between the two cylinders. This is a check valve located at the entrance to that part 30′ of the passage which is herein designated the air passage, being the part that leads from the air cylinder to the fuel inlet. If this check valve be used the necessary clearance in the air compressor may be reduced to a minimum so that the suction of fresh air through the air inlet valve 22 begins practically as soon as the outward stroke begins. This valve is shown in Fig. 1 only, but may be incorporated in any of the other designs illustrated if desired. It is mainly supplementary in character; and besides permitting a reduction in the diameter of the air cylinder it may also be utilized by a designer, in conjunction with the intermediate valve to change the timing and amount of scavenging of the combustion passage and for other incidental effects. A jacket of exhaust gases, arranged by conducting the gases through a pipe to an enveloping chamber 26 may be employed to keep heat from escaping from air in the passage 30′. This envelop may be packed suitably, as by piston rings 26″, between which a viscous oil may be introduced through a cap-closed hole 26‴, thus making an expansion joint. It will be understood that the drawing in Fig. 1 is made somewhat diagrammatically in order to get as many parts as may be into view, and that their arrangement may in practice be varied considerably. A starting valve, for initial introduction of compressed air in the power cylinder for starting the engine, if that method of starting be employed, and other parts, the use and construction of which will be readily understood are omitted.

When the apparatus is in operation the exhaust valve, which is mechanically operated by any suitable means, not shown, may be expected to close at 20° to 40° before the piston 11 reaches its inmost limit of stroke. At about that time, the intermediate valve 24, whose action is that of a check valve controlled by a cam 27, is permitted to open under pressure of the air behind it, backed up usually by pressure of air in the cylinder 20, the air piston 21 being then about in midstroke, and a little fuel is introduced through the nozzle 31. These two mix together and are ignited; and the addition of heat resulting from their combustion increases the pressure in the combustion chamber to that desired for the beginning of stroke. This supplies the pressure which in some types of engines is obtained by "compression" in the power cylinder. Increased injection of fuel for the main working stroke follows. In an engine arranged to utilize liquid fuel, which is the particular type chosen for illustration, the liquid fuel enters in atomized form under impulse from a simple mechanical pump, which is omitted from the drawings as it may be of any suitable type, driven by a cam so that the rate of introduction of fuel proceeds at a rate substantially proportionate to the rate at which air is flowing past the nozzle. Thus it is immediately and intimately mixed with fresh air, in which it is volatilized and with which it progressively combines while the introduction of air and fuel continues. The quantity of air is regulated by the known compressing capacity and rate of compression of the cylinder 20 and piston 21, the known pressure and volume simultaneously existing in the combustion chamber 30 and the predetermined opening of the valve 24 whose degree or extent of opening is at all times controlled by a cam typified at 27, so that it is open more or less at any particular instant, as predetermined by the designer, according to the simultaneous surrounding conditions. When the inflow of the main charge of fuel has ceased, during which combustion has been occurring preferably at substantially "constant pressure," the outward stroke of the power piston is well under way, and expansion then occurs until the exhaust valve is opened. If a check valve 25 is used, then the pressure within the air passage 30′ may be maintained at any desired point below the maximum attained, by closing the intermediate valve 24 at the proper time. The air piston meanwhile has finished its stroke and has started outward, immediately upon which the check valve 25 closes.

The passage 30′ represented in Fig. 1 is long, relative to the length shown in my said other application for patent, in which, when the cylinders are shown almost in contact, and is in fact long enough for a bearing on the main shaft to intervene between the two pistons 11, 21. The features of the invention are such that it may be even much longer, as represented in the other figures, without serious waste of heat, and with operating results much as if the connection of power cylinder to air cylinder were shorter. Among other things, this permits the placing of air cylinders at an angle to the power cylinders as in Fig. 9, with pistons connected to the connecting rods of the power pistons, and properly timed; and this in turn eliminates from the main crank shaft the cranks and separate bearings for the air pistons, or eliminates the need for an auxiliary shaft, thus materially compacting the engine and reducing friction.

Figure 6:
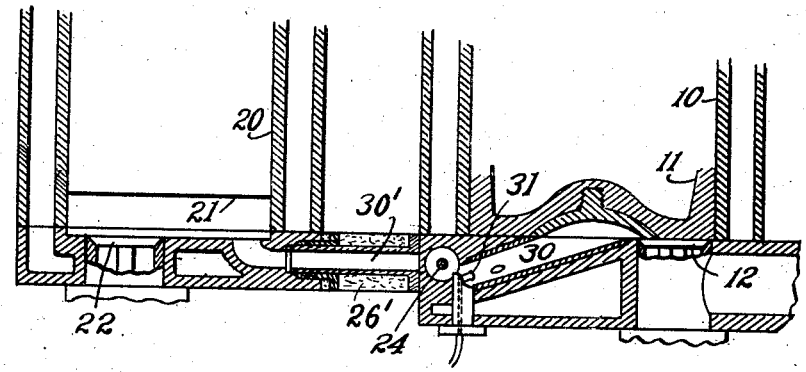
Fig. 6 is a plan, showing an embodiment of the invention as it may be applied to a horizontal engine, in section on the medial plane through the cylinders, marked 6—6 in Fig. 7.
Figure 8:
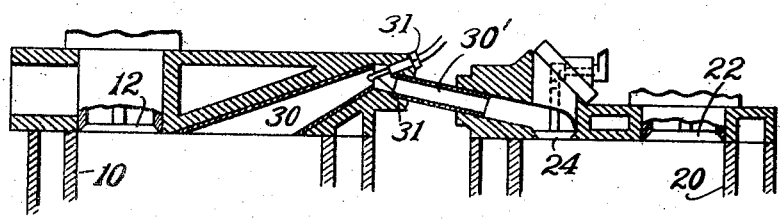
Fig. 8 is an elevation of a different embodiment of the invention, somewhat similar to that shown in Fig. 1, in section on a medial plane through the head end of the engine.

Engines of this type will ordinarily be multi-cylinder having corresponding numbers of air and power cylinders grouped together, either as simple multiples of the single pairs which in Figs. 1, 6 and 8 constitute complete units, or with some different arrangement or connection, instances of which are seen in Figs. 10, 13 and 16.

Fig. 6 illustrates an arrangement for a horizontal engine. By way of showing variety an insulating material 26' is indicated in place of the exhaust passage shown in Fig. 1 as surrounding and enveloping the air passage 30', and a stuffing box is indicated at the expansion joint. The intermediate valve 24, as clearly seen, is close to the fuel inlet which is through the tube 31 so that the greater part of the air passage 30' is shut off from the fuel and combustion passage, and so from the clearance space of the power cylinder, when this valve is closed; and the invention permits of making the passage long enough to set this valve thus close, and yet vertical as before, in order to be most accurately controlled notwithstanding the conditions and the wear that may occur in usage.

Figure 2:
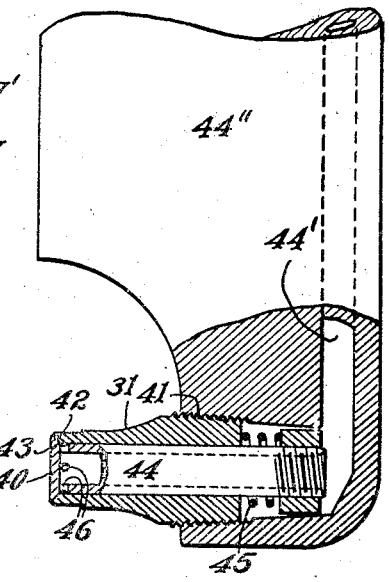
Fig. 2 is a longitudinal section through a detail of Fig. 1, much enlarged, being the nozzle 31 for introduction of fuel.
Figure 3:
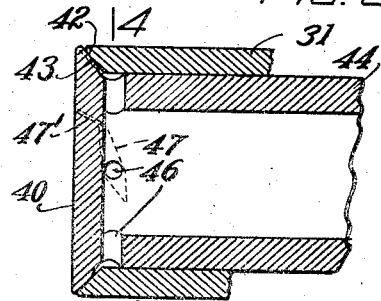
Fig. 3 is a similar view, further enlarged, of a detail of Fig. 2.

The fuel inlet valve designated by the general term 31, which is the designation of its principal visible outside part, in the various figures may be of any suitable type; but types which have been found particularly good in practice are illustrated in Figs. 2, 3, 4 and 5. Referring to Fig. 2, 31 represents a tubular plug of metal having a thread 41 by which it may be screwed tight into the wall of the plug 44'' which is to hold it in the combustion passage, and having lips 42 with a concave conical surface, against which convexly conical lips 43 on the movable part 40 of the valve are adapted to fit, so as to shut off the oil except as small grooves may remain open as below described. The piece 40 is on the end of a tube 44 which fits within the tube 31, is movable in the axial direction thereof, is hollow and has a spring 45 strung upon it which may be of any strength desired or suitable, tending to hold the valve piece 40 seated on the tube 31 with the two faces 42 and 43 against each other. The tube 44 is adapted to receive fuel oil from a supply pipe or passage 44', which may be in a plug 44'' insertible through the wall of passage 30. In operation a continuous column of liquid fuel extends from the injecting pump (not shown) through the passage 44' and tube 44 and openings 46 therein, to the valve closure 43—42. The openings 46 may be small radial holes through the wall of the tube 44. From them may lead supplementary passages 47 in the nature of grooves filed or milled in the exterior of the tube 44 extending from their outlets partly across the face 43, and with continuations consisting of very small grooves 47' if desired, continuing all of the way across to its very edge, as described and claimed in my pending application for Patent No. 8830. When the valve is closed its faces 43 and 42 are in contact so that there is no opening, or so that there is no opening but that through the very small continuation grooves, which is too small for oil to flow through except when pushed; but increase of pressure in the fluid in the tube 44, whenever the fuel pump begins to work, forces the surfaces 43 and 42 apart; and on those occasions, at the beginning of the opening movement and at the end of the closing movement, and more or less between during the main delivery, the oil is concentrated in small streams at the particular location where the grooves 47 and 47' are. These are four in number, as represented, although there might be any number. Considering the very small quantity of oil which may be delivered at each stroke, this produces a relatively even distribution; and the distribution is also more or less equalized during the main flow because of these. The holes 46 are of equal size and of sufficiently small aggregate cross section so that some oil is pretty sure to pass through each of them at each discharge. At the same time they are large enough individually, a result obtained by making them few enough, to guard the danger of their being clogged. This arrangement produces concentration of the oil at a few points, in passing to the outside of tube 44, whereas distribution of it is wanted in the passage 30. The major grooves 47 provide this distribution, extending as they do part way around the tube from the holes 46. As they do not extend entirely across the surface which forms the valve closure, oil escapes more or less over their sides as well as from their ends, and so is distributed more around the periphery than if it issued only from the ends of grooves, or from holes 46 without any grooves. In so escaping between the surfaces, which it must traverse to get free of the valve, it is very thoroughly filmed and broken up. However, whether accomplished by this specified means or otherwise, it is preferable that the arrangements be such that the oil fuel enters the combustion chamber in the form of a spray and with considerable velocity, and is distributed generally throughout the air which is at the moment in the vicinity of this fuel inlet valve 31. With the type illustrated it is distributed in all directions through that air, the same being on all sides of that valve.

Figure 4:
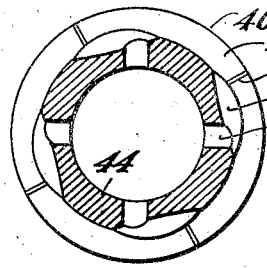
Fig. 4 is a transverse section of the same, being on the line 4—4 of Fig. 3, with the shell 31 omitted.
Figure 5:
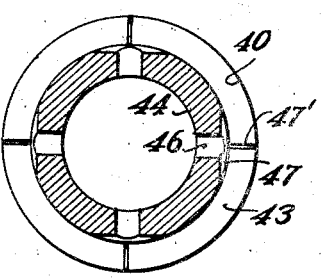
Fig. 5 is a similar view of a modified form.

In the type of nozzle shown in Fig. 2 the grooves 47 are oblique to its axis, but the small grooves 47' may be radial. The direction of the grooves 47 is shown by the dotted lines in Fig. 3. A variation of this is shown in Fig. 5 where the grooves 47 are arranged parallel to the discharge holes 46.

In my said application for patent, Serial No. 8828, I showed a type of fuel nozzle which sprayed across from one side of the combustion passage. In engines of large capacity a large cross sectional area of combustion passage is preferably provided to accommodate the large flow of air. In this connection the feature of the present invention which permits the placing of this valve in the midst of the passage, with distribution thence across the passage in all directions simultaneously, is valuable as tending toward complete distribution of oil through the main body of air which is to burn it. Without this, difficulty may arise from the fact that a very small quantity of oil per stroke is needed, and that this quantity is so small that unless properly handled it may not have sufficient penetrative power when injected to pervade fully in the form of spray the air in which it is to be volatilized and burned. The making of the entire passage between the cylinders in two divisions by the placing of the intermediate valve in the midst permits the making of that passage long enough to have an angular or elbow shape, as seen in Fig. 1 where the fuel nozzle is; and this facilitates the simple insertion of the tubular nozzle 31 endwise at the angle as seen in Figs. 8 and 6; or, because of its elevation above the cylinder, facilitates the sidewise insertion of a plug-cage carrying such a nozzle as in Figs. 1 and 2.

Another advantage gained from this same division of the passage, and from the increase of workable length thus made possible, is that the fuel valve and the beginning of the combustion passage can be placed at a little distance above the cylinder head, so that the passage leading thence into the power cylinder does not converge on any diameter and may in fact preferably diverge on every diameter. Another feature resulting from this is that the combustion passage can be made of large cross section at its junction with the power cylinder without too great enlargement of the clearance space, thus giving space for the combustion and the flow of hot gases without the stream impinging or impacting seriously anywhere on the walls. However, if preferred, the intermediate valve 24 may be located at the head of the air cylinder 20 and the check valve 25 omitted, as in Fig. 8. In this case the clearance of the power cylinder includes the space which in Figs. 1 and 6 is called the air passage 30'. This is the style which is particularly more apt to be chosen by a designer in cases where the engine is not to run at a very high pressure. On the other hand, if preferred, the intermediate valve 24 may be placed as shown in Fig. 1 and the check valve 25 may be omitted, in which case the space 30' becomes a part of the clearance of the air cylinder.

Another feature of novelty of the invention consists in the provision of a cup-shaped depression in the middle of the piston head opposite the discharge end of the combustion passage. By this the impinging of the hot products against the piston head as they issue from said passage is materially reduced. This is because the stream falls into a sort of pool of its own material in which the eddy currents largely prevent the impact of the stream itself against the bottom of the depression, thus increasing the depth of the relatively stationary body of fluid. The increase, being in the direction in which the jet is flowing into it, tends to decrease the force with which that jet strikes the restraining material. And particularly is this true when taken in conjunction with the oblique direction of said discharge. Inasmuch as any space existing over the face of the piston, beyond the depression, is filled with fluid under substantially the same pressure, the oblique characteristic gives the effect of a deeper depression, without the depth in the direction of the axis being actually any deeper. The provision of such depth in the direction of the axis might increase the clearance beyond the degree desirable in an engine designed for high capacity and efficiency. A lining of heat-resisting material may be placed in this cup-shaped depression. Being centrally disposed and preferably centrally mounted, the stresses set up therein by heat are distributed somewhat uniformly throughout it. The tendency to expansion of metal is more uniform about the axis than would be the case if the hot gaseous contents, burning and burned, issuing from the combustion passage 30 impinged upon the side or marginal portion of the head of the piston and the head end of the cylinder.

In mechanism of the type which is under consideration the conditions of heat stresses in certain parts of the combustion chamber are severe in the extreme. Especially is this true of the wall surrounding the discharge end of the combustion passage, even when designed to reduce to a minimum the degree of impinging of hot products against them. A large discharge end of the passage combined with a relatively large cup-shaped depression in the piston is conducive to the reduction of the impingement of hot products against the walls of the combustion chamber in this region. The feature of beginning combustion within the combustion passage before the maximum pressure is reached therein permits the construction of these parts with larger dimensions than is otherwise possible if maximum power for a given weight of engine, combined with efficient operation is desired. Also, if the less volatile fuel oils are to be effectively mixed and completely burned within an engine it is desirable that no liquid particles should be permitted to strike water cooled surfaces before combustion is completed. A loosely fitting lining which may be supported in one or more pieces separate from the water cooled pressure sustaining walls is the best solution of these combined difficulties. Ordinary refractory or heat resisting materials may crack, and the common iron compositions will oxidize more or less rapidly, but I have discovered that one-third or two-thirds of nickel alloyed with iron is durable as well as easily cast in any desired form for such a lining.

In ordinary operation this lining in the combustion passage also serves as an igniter for each successive charge of air and fuel; but for starting, a hot plug, or any suitable electric device, at the point 32 may be used. In order to burn the more difficultly volatilizable fuel oils it may be desirable to separate the time and place of volatilization from the time and place of combustion of any particular particle of oil and this can be done effectively by controlling the temperature at the point of fuel introduction and yet obtain progressive combustion farther along in the combustion passage.

Figure 7:
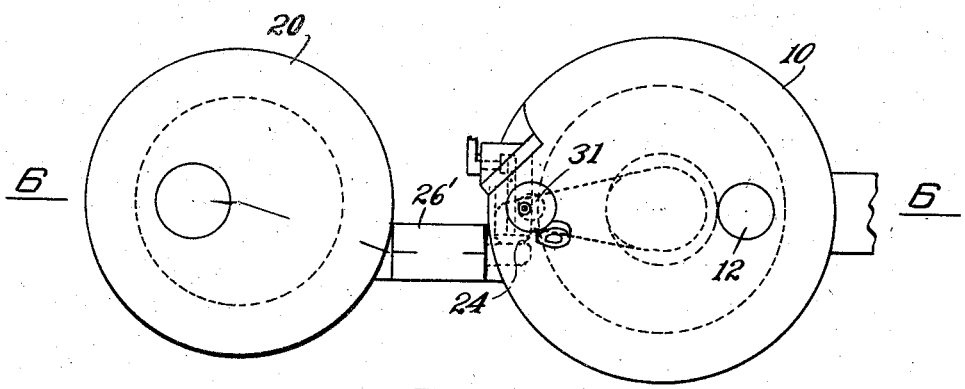
Fig. 7 is an end elevation of the same.

Referring now to the general application of this type of engine and to the method upon which it operates and to arrangements for its practical use, the drawings show simple vertical engines in Figs. 1 and 8 where a single power and a single air cylinder may be supposed to have their pistons connected to the same shaft; a simple horizontal type in Figs. 6 and 7; and multi-cylinder arrangements in three styles, Figs. 9 and 10 being one, Figs. 12 and 13 being another and Fig. 16 another.

In Fig. 9 the power cylinders 10 are arranged vertically and the air cylinders 20 are inclined so that their pistons finish their in-strokes the precise number of degrees which the designer wishes after the power pistons finish their in-strokes. In this case the crank shaft 50 carries a crank 51 and a connecting rod 52 for each of the power pistons 11. A boss 53 on each of these connecting rods is the bearing for the wrist pin 54 of the connecting rod 55 of one of the air pistons 21, each such pin being so placed that the completion of the air piston's stroke will occur at the desired arc of difference from the completion of the power piston's stroke. In the present case this is assumed to be 45°, which, in addition to serving well the cycle on which the engine operates, enters and coöperates as an element in the multi-cylinder reversible engine construction herein set forth. It is preferred in this case to set the power cylinders 10 so that the plane passing through their vertical axes is offset somewhat to the right, i. e., in the direction of forward rotation, from the plane passing vertically through the axis of the crank shaft 50, thereby reducing friction and lateral pressure on the power stroke; and it is likewise preferred to offset the air cylinders so that the plane passing through their axes is to the left of the plane passing parallel to them through the center of the crank shaft 50, i. e., offset in the opposite direction to forward rotation, thereby reducing friction and lateral pressure on their inward strokes. This spreading of cylinders, by offsetting them in opposite directions, produces a relation of the cylinders to each other by which the cylinders can be set with their head ends considerably nearer to each other while still preserving the required angular relation to each other than would be possible if all were set with their axes in planes passing through the crank shaft. This result is most important in reducing the length of the air passage and is of special utility in marine and other work where head room or space is limited. Furthermore the crank driving the air piston and power piston which are connected directly under the above arrangement is preferably operated in the direction shown by the arrow in Fig. 9, in which case the air piston is in the lead of its particular power piston. Connections between air and power pistons are arranged as shown in Fig. 10, so that each air cylinder delivers into some other power cylinder. Assuming that the latter are four in number with their pistons set 90° apart, that air piston which leads its power piston is approximately directly connected 45° behind the next adjacent power piston, to which the air passage is connected as illustrated in Fig. 10. In this case the direct connection of pistons in pairs applies only to the six middle cylinders, one of the air cylinders being set at one end of the row and one of the power cylinders at the other end of the row, and separately connected to the crank shaft.

Novel means for making this engine reversible consists of means for shifting the air connections, whereby an air cylinder whose piston when running forward lags behind that of an obliquely opposite power cylinder to which it is connected, is by the turning of a cock or valve, connected to the cylinder directly opposite it, whose piston it would lag 45° behind when running backward although leading it 45° when running forward. One form of the system of cross connections is illustrated in Fig. 10, which may be considered as being all in the air part of the passage 30' and as having valves 60 which when the engine is running forward are set so as to connect from air cylinders A, B, C, and D to power cylinders A', B', C' and D' respectively, through passages $a$, $a'$, $b$, $b'$, etc. When running in the opposite direction the route is, for example, from B through $b$, $e'$ and $a$, to A', except that cylinders A and D' run idle when reversed, the engine, under this arrangement having three-fourths power when reversed. In this construction the passages marked with $e$, $e'$, etc., are closed when going ahead, being used only when running reversed. The valves and other parts are shown more or less diagrammatically. The square heads of valves indicate that they can be turned from one to another position, but practically the valves would ordinarily be connected in a gang so that all would be properly set by a single motion of a lever controlling the gang, a construction which it is believed not necessary to illustrate in detail; and suitable mechanism for reversing other parts of the engine would of course be used in connection with this. Detail of one of the valves 60 is shown in Fig. 11 where the ports are marked to correspond to the passages of Fig. 10. The ports $b$, $b'$, $e'$ and $e''$ are all in the same plane so that the turning of the plug about 20° changes a direct connection between $b$ and $b'$ as shown by the dotted lines of Fig. 11, into two direct connections, $b$ to $e'$, and $e''$ to $b'$.

In the multi-cylinder engine illustrated in Figs. 12 and 13 the air and power cylinders are arranged with all axes vertical, and yet it has only one crank on the main shaft for each pair of cylinders. In this novel arrangement the cylinders are rather close together and may be set even closer than the illustration shows, with the connecting air passages overlying the cylinder heads. The diagrammatic Fig. 13 is sufficient to illustrate the general arrangement which may be adopted. The power cylinders are offset a little to one side and the air cylinders a greater amount to the other side of the axis of the crank shaft, as seen in Fig. 12. Each power piston 11 has a rigidly attached piston rod 62 guided in a cross head 63 from which a connecting rod 64 extends to the crank 51. The air piston 21 has a pivotally attached piston rod 65, whose outer end is pivoted to a connecting rod 64, which is integral or rigidly connected with the connecting rod 64 of the power piston. In the drawing the single triangular element 64 constitutes both of these connecting rods. Although the greater part of the stress passes along the edges of the triangle in each case, the distribution and direction of stresses are affected by the shape and connections of this single piece, to all parts of which the reference numeral 64 applies. These two connecting rods are joined in V-shape; and the jointure is strengthened by an element extending across the spread ends of the V from the cross head 63 to the air piston rod pivot 66. The cross head 63 affords a guide for the end of the air piston rod, which, as a net result of the rectilinear reciprocation of the cross-head 63 and the revolution of the crank pin 51 moves approximately in an elliptical path, the minor axis of which is so short that the cross-head thrust imposed upon the piston 21 is at no time very great.

With the air passages connected as shown in Fig. 13 the sequence of cranks should be as follows: If the crank to which the pair of pistons in cylinders N and N' are connected is assumed for reference as at 0°, then, that of M and M' is at an angle in an anti-clockwise direction of 270° with it, that of L and L' is at 90°, and that of K and K' is at 180°. When running ahead the flow of air is from K through $k$, $l'$ to L', from M through $m$, $o$, $k'$ to K', from L through $l$, $o'$, $n'$ to N' and from N through $n$, $m'$ to M'. When reversed the flow is from K through $k$, $k'$ to K', from L through $l$, $o$, $l'$ to L', from M through $m$, $o'$, $m'$ to M', and from N through $n$, $n'$ to N'. This change in direction of flow may be accomplished by turning simultaneously by any convenient means the four-way plugs in the three valves 60' through an angle of 22½°. The details of one of these plug valves is shown in Figs. 14 and 15 where the inlets and outlets are similarly marked.

In both of the cases last mentioned the air piston and the power piston which are connected to a particular crank sustain their maximum load at different crank positions, with the result that the imposition of both pistons on the same crank shaft does not increase the maximum stresses beyond those imposed by the power pistons alone when the engine is running ahead.

Since this is not true when running reversed, the injection of fuel may then be retarded slightly in order to reduce materially the maximum pressure. In the modification shown in Fig. 10 the extra length of air passages ($e'$, $e''$, etc.) used when running reversed will also tend to reduce the maximum pressure attained. The same effect may be obtained in the modification shown in Fig. 13, by arranging the cams which operate the air inlet valves when reversed so as to hold these valves open during the earlier portion of the compression stroke.

Another feature of the invention is illustrated in Fig. 16 where the maximum pressure to be sustained by the crank shaft is never greater than that imposed by the power piston alone, whether reversed or not. In this compact style of engine the air cylinders are combined directly with power cylinders having double acting pistons. While the feature of the invention here disclosed may be applied to various groupings of cylinders it is illustrated as applied to a group of three arranged in succession on the same crank shaft, designated 50 as in the other types. Conventional connecting rods, cross-heads and stuffing boxes are represented for the piston rods. The pistons 71 intervene between the parts 70 of the cylinders used for power and parts 72 used for air. In this case connections are provided in the form of air passages extending from the air side of one piston to the power side of another piston. The connections are clearly indicated by the dotted lines in the central valve 73 illustrated, going from X to Y', from Y to Z' and from Z to X' when running ahead. When reversed the three-way plug (in valve 73) is turned 30° in a clockwise direction and the flow is then from Z to Y', from Y to X' and from X to Z'. As the pistons are 120° apart the air piston Y is 60° short of reaching its end of compression stroke when the power piston in Z' to which it delivers is at its beginning of stroke, whereas it is desired that it be at that instant only 45° in the rear. In order that it shall deliver air at this instant at the desired pressure the apparatus and connections thereto shown at the right in Fig. 16 are provided for combination therewith. This consists of an air pump having a cylinder 80, a piston 81, an inlet valve 82, a discharge passage with check valve 84, and a receiver 85. The piston 81 has a piston rod 86 guided in a cross-head 87, these parts conveniently being made cylindrical and connected through rod 88 to the crank 89 on the main shaft, which may be an overhung crank, not requiring a bearing beyond it, because the duty of this pump is light. The piston 81 may be double acting if desired for certain uses; and to that end the cylinder is closed as at 90 and is provided with another inlet valve 82'; with discharge and check valve 84' to the receiver 85. When it is desired to run the pump single acting a large slide valve 91 may be opened through this wall 90, making free communication of this part of the cylinder with the atmosphere. As a piston, e. g., the middle one, is in all parts of its stroke 15° later than the 45° lag behind Z desired, the receiver is connected to all of the air cylinder inlet valves through a pipe 92 so that the air entering each cylinder is under low pressure. Being filled with air at this low pressure when the compression stroke begins, the requisite amount of air may be forced into the connected power cylinder by the time the compressing piston has come to within 15° or 20° of its inner end of stroke which is the condition desired (and obtained with a normal lag of 45°).

The intermediate valve, which is presumed to be included in each cylinder head of the engine as described more in detail hereinbefore, and see Figs. 1 and 8, having permitted the flow of air to begin at the proper time, the flow continues through the next 40° or 45° of stroke. The final 15° or 20° of inward stroke of the air piston may be utilized for forcing additional air into the combustion passage; but, preferably, since the clearance space in the relatively long air passages here used is quite considerable, the intermediate valve may be closed and the remaining travel of the air piston permitted to build up the pressure within said clearance space, which pressure increase would not be sufficient to be objectionable. If it be desired to run the engine at greater capacity, or under what are sometimes called "overload" conditions, the passage of air through the intermediate valve into combustion and power cylinder may be allowed to continue through the remaining 15° of compression stroke and fuel may be injected during the same time, thus enlarging the power, subject to the usual disadvantage that expansion in the power cylinder does not proceed to quite so low a point as would be preferred if efficiency rather than large power were the main point sought. When this extra amount of air is to be used, as for overload conditions, the slide valve 91 is closed and the piston 81 is double acting, thus supplying to the receiver 85 the extra amount of air required.

In Fig. 16 is illustrated a type of packing 93 for a piston rod 86 which is particularly useful for an air cylinder such as X, Y or Z of the same figure, although it is shown only on the air pump cylinder 80 in order to avoid complicating the drawing. In this the piston rod 86 may be enlarged above the size needed for strength alone and the cylinder 80 is provided with a cylindrical extension 87 at its crank end, smaller than the cylinder and adapted to fit said enlarged piston rod; and piston rings 93 are fitted on the enlarged piston rod and within the extended shell 87. This portion may thus serve both as cross-head and as packing which is tight with a minimum of friction. It is thus superior to an ordinary piston rod stuffing box, and is particularly adapted to cylinders such as X, Y and Z where the pressure of contents at end of stroke is high.

The passage hereinbefore referred to as a combustion passage may with propriety be called "mixing and combustion passage" because it is one feature of the invention that a thorough mixture of fuel and air is made therein by the projection in a positive fashion of finely divided fuel through the air at a place where body of air is thin and therefore is penetrable completely by the very small particles of fuel with such momentum as it is feasible to impart to them by the projecting device.

The thoroughness of the mixture thus attained contributes to the promptness with which combustion is completed later in the passage. The conditions thus set up within the passage may be extremely severe for the metal surroundings to endure. To minimize this it is contemplated that the passage shall be constructed with sufficient length to provide flow distance for the burning mixture, such that the combustion may be practically completed before the impact of the flowing current upon the walls occurs; and provision is made by making the passage with diverging walls and by providing a space at the end of the passage for lateral expansion, reducing the intensity of impact because of the resulting diffusion and reduction of velocity. In addition it is to be noted that in so far as the piston moves outward from its inner end of stroke, the point where the axis of the passage would penetrate it, or what may be deemed the center of the flowing stream, becomes incident upon a different part of the piston face, owing to the inclination of the passage at an acute angle. The fact that the impact is at such an angle instead of being perpendicular to the surface it strikes is another feature. These features further distribute and minimize the ill effects. If there be a recess in the face of the piston the gases therein cushion the impact of the hotter gases following.

The provision of flow distance as above set forth, and room for lateral expansion, may involve the introduction of more open space than is consistent with the obtaining of a "compression" adequate for attaining high thermal efficiency coupled with capacity. This is particularly so when, as here, the exhaust valve remains open until late in the power piston's inward stroke. To render the engine efficient the invention therefore provides for the combination, with those features, of means to admit fuel and air to the mixing and combustion passage while the contents of clearance space are still at pressure far below the maximum pressure of the cycle; and by igniting it promptly to raise by progressive combustion, the pressure in the clearance before the admission of the main charge which occurs when the piston is in position proper for the same. This early admission is effected by the cam 27 controlling the air valve 24, and that (not shown) controlling the fuel pump opening the former to a small degree for flow of air corresponding to the flow of fuel admitted. Since flow distance combined with diverging walls necessitates a considerable clearance space and since early combustion is the means by which the capacity and efficiency is maintained, under these conditions therefore, their interrelation and combination is most important, particularly for heavy oil engines.

It is desirable to place the oil nozzle close to the power cylinder, and it is preferable that the clearances do not extend from the power cylinder much beyond this inlet; hence the valve 24 should be relatively close to the power cylinder. When the distance of the air cylinder from the power cylinder is considerable, this leaves a long air passage. The air which first enters the mixing and combustion part of the passage, at each cycle, in cases where a so-called "heavy" or difficultly volatilizable oil fuel is used, has to convert that into vapor quickly, in order that the needed combustion may be quickly brought to completion for raising the pressure before the main charge comes in, and in order to avoid the deposit of carbon or other remnants of incomplete combustion. In the case above stated this air, coming before the air piston has effected its main work, is at a lower temperature than the air which follows it, and which it may be assumed is hot enough to effect such volatilization under the conditions prevalent upon its admission. The admission of heat to this early air beyond that due to its compression, by passing it through a pipe whose exterior is heated by the exhaust gases thus equalizes temperature of incoming air and makes complete volatilization and quick combustion more certain. The advantages of this may be particularly noticeable when relatively long passages exist between the air and power cylinders, as in engines arranged with cross connections between passages so that the engine can be reversed.

In engines of the latter type there are notable advantages in the style shown in Fig. 16, with three pistons equiangularly spaced on a single crank shaft, each serving both as a power and an air piston. Assuming that about 45° is wanted, of lag of air piston behind the power piston to which it delivers its air, I have discovered that this lag cannot otherwise be obtained in a completely reversible engine with less than eight power cylinders on a single shaft and that even then the air passages would have to be disadvantageously long in one or more cases. By the arrangement shown in this figure, an engine having only three cranks, with a small auxiliary pump—which might be a rotary pump if preferred—serves the purpose, the equivalent of the desired lag being attained by the means specified. It is an additional advantage that the proper connections of passages for reversing are attained by a single valve, so that there is no possibility of the engine operator setting part but not all. It is of course understood that the engine embodies proper reversing mechanism in other respects, suitable for setting of cams, and other valves, no description of which is needed here.

I claim:

1. In an internal combustion engine, the combination of a cylinder; a mixing and combustion passage leading thereto; means to introduce the main charges of air and fuel into the passage gradually with progressive combustion during flow toward and into said cylinder; and a piston whose head is close to the head of the cylinder during said flow; there being a recess in one of said heads providing a space located to receive delivery of said passage which is greater than the space elsewhere between the close-together heads.

2. In an internal combustion engine, the combination of a cylinder; a mixing and combustion passage leading thereto; means to introduce the main charges of air and fuel into the passage gradually with progressive combustion during flow toward and into said cylinder; and a piston whose head is close to the head of the cylinder during said flow; the said passage being arranged on a substantially rectilinear axis at an acute angle with the axis of the cylinder.

3. In an internal combustion engine, the combination of a cylinder; a mixing and combustion passage leading thereto; means to introduce the main charges of air and fuel into the passage gradually with progressive combustion during flow toward and into said cylinder; and a piston whose head is close to the head of the cylinder during said flow; there being a recess in one of said heads providing a space located to receive delivery of said passage which is greater than the space elsewhere between the close-together heads, and the said passage being arranged with its line of delivery at an acute angle with the face of the piston, whereby intensity of impact of flowing hot products on the piston is relatively low.

4. In an internal combustion engine, the combination of a cylinder; a mixing and combustion passage leading thereto; means to introduce the main charges of air and fuel into the passage gradually with progressive combustion during flow toward and into said cylinder; and a piston whose head is close to the head of the cylinder during said flow; the walls of said passage being diverging and its junction with the cylinder being at an angle such that by the combined effect of the angle and the divergence the area of its discharge opening into the cylinder is relatively large and spread out whereby the intensity of impact of gases against the piston is relatively low.

5. In an internal combustion engine, the combination of a cylinder; a mixing and combustion passage leading thereto; means to introduce the main charges of air and fuel into the passage gradually with progressive combustion during flow toward and into said cylinder; and a piston whose head is close to the head of the cylinder during said flow; the walls of said passage being diverging and its junction with the cylinder being at an angle such that by the combined effect of the angle and the divergence the area of its discharge opening into the cylinder is relatively large, and there being a depression in the piston head toward which the gases issuing from said passage are discharged.

6. In an internal combustion engine, the combination of a power cylinder and piston; a passage leading into the head end of the cylinder; means to force a main charge of compressed air through said passage; means at the axis of said passage to project atomized fuel into said air and transversely of the direction of its flow; and a device whereby the fuel is ignited within said passage, combustion occurring progressively with flow toward and into said cylinder.

7. In an internal combustion engine, the combination of a power cylinder and piston; a passage leading into the head end of the cylinder means to force a main charge of compressed air through said passage, means at the axis of said passage adapted to project atomized fuel conically into said air with the axis of the cone approximately parallel to the direction of flow of air; and a device whereby the fuel is ignited within said passage, combustion occurring progressively with flow toward and into said cylinder.

8. In an internal combustion engine, the combination of a power cylinder and piston; a passage leading into the head end of the cylinder; means to force a main charge of compressed air through said passage; means to project atomized fuel in said passage into said air and across the direction of its flow; and a device whereby the fuel is ignited within said passage, combustion occurring progressively with flow toward and into said cylinder; the said passage having a small cross section at the place of fuel projection, thereby making fuel mixing complete with short penetration, and a progressively larger area of cross section toward the cylinder, thereby diffusing the impact of hot gases.

9. In an internal combustion engine, the combination of a power cylinder; a piston traveling close to the head end thereof; a passage leading to the head end of the cylinder; forming part of the clearance, having a part where fuel is admitted and through which the main charge of air must pass, and becoming progressively larger beyond, providing sufficient volume for substantially complete combustion of the fuel charge of a cycle to occur before impact thereof on the walls; means to force a main charge of compressed air into said passage; means to project atomized fuel through said air as it passes; and a device for ignition within said passage, combustion occurring progressively with flow toward and into said cylinder.

10. In an internal combustion engine the combination of a power cylinder and piston; an air cylinder, with piston lagging behind the power piston; a passage thence to the power cylinder; means therein located at a distance from the air cylinder dividing the passage into air and mixing portions, said mixing portion being part of power cylinder clearance wherein occurs combustion of the main charge of air and fuel progressively with flow toward and into the power cylinder; and means for projecting atomized fuel at said mixing portion; the said passage having an arch formation from one cylinder to the other with the said mixing portion making an acute angle with the power piston and having no angle itself.

11. In an internal combustion engine the combination of a power cylinder and piston; an air cylinder, with piston lagging behind the power piston; a passage thence to the power cylinder; means therein located at a distance from the air cylinder, dividing the passage into air and mixing portions, said mixing portion being part of power cylinder clearance wherein occurs combustion of the main charge of air and fuel progressively with flow toward and into the power cylinder; and means for projecting atomized fuel at said mixing portion; the said passage having an arch formation from one cylinder to the other and the projecting device being inserted therein along the axis of the descending limb of the arch.

12. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; one of the air pistons being connected to a crank to which is connected a power piston; the whole being arranged with air pistons lagging behind the pistons in the power cylinders to which their cylinders are connected, and adapted to force a main charge of compressed air for each power cylinder through its said passage while the power piston therein is close to its head end of stroke.

13. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; one of the air pistons being connected to a crank to which is connected a power piston; the whole being arranged with air pistons lagging behind the pistons in the power cylinders to which their cylinders are connected; and adapted to force a main charge of compressed air for each power cylinder through its said passage during progressive combustion and flow toward and into said power cylinder and while the power piston therein is close to its head end of stroke.

14. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; one of the air pistons being connected to a crank to which is connected a different power piston from that to whose cylinder is connected the air cylinder in which said air piston is; the whole being arranged with air pistons lagging behind the pistons in the power cylinders to which their cylinders are connected, and adapted to force a main charge of compressed air for each power cylinder through its said passage during progressive combustion and flow toward and into said power cylinder and while the power piston therein is close to its head end of stroke.

15. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; the whole being arranged with air pistons lagging behind the pistons in the power cylinders to which their cylinders are connected, and adapted to force a main charge of compressed air for each power cylinder through its said passage during progressive combustion and flow toward and into said power cylinder and while the power piston therein is close to its head end of stroke; and means for disconnecting an air cylinder from its said power cylinder and connecting it to another of the power cylinders, whereby suitable timing is provided for reverse running.

16. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; the whole being arranged with air pistons lagging behind the pistons in the power cylinders to which their cylinders are connected, and adapted to force a main charge of compressed air for each power cylinder through its said passage during progressive combustion and flow toward and into said power cylinder and while the power piston therein is close to its head end of stroke, and cross connections between said passages, with valves, whereby one of said power cylinders may be connected with either of two of said air cylinders whose piston timing relations are suitable for running in opposite directions.

17. In an internal combustion engine the combination of a crank shaft and a plurality of pistons connected thereto; cylinders for these pistons closed at opposite ends and having valves whereby one end constitutes a power cylinder and the other end an air compressing cylinder both of which are served by the same one of said pistons; passages, connecting air and power cylinders in pairs in which the air piston ends its compressing stroke during the power stroke in the power cylinder to which it is connected; means to introduce the fuel for each power cylinder into its said passage; and a valve in said passage between the fuel inlet and the air cylinder; the whole being arranged and adapted to force the main charge of air for each cycle through said passage during progressive combustion and flow toward and into said power cylinder and while the power piston therein is close to its head end of stroke.

18. In an internal combustion engine, the combination of a crank shaft and a plurality of pistons connected thereto; cylinders for them closed at opposite ends and having valves whereby the end remote from the crank shaft constitutes a power cylinder and the end through which said connection of piston to crank shaft passes constitutes an air compressing cylinder; both of which are served by the same one of said pistons; passages connecting air and power cylinders in pairs in which the air piston ends its compressing stroke during the power stroke in the power cylinder to which it is connected; means to introduce the fuel for each power cylinder into its said passage; and a valve in said passage between the fuel inlet and the air cylinder; the whole being arranged and adapted to force the main charge of air for each cycle through said passage during progressive combustion and flow toward and into said power cylinder and while the power piston therein is close to its head end of stroke.

19. In an internal combustion engine the combination of a crank shaft and three pistons connected thereto at equiangular distances apart; cylinders for them closed at opposite ends and severally having valves whereby one end constitutes a power cylinder and the other end an air compressing cylinder both of which are served by the same one of said pistons; passages, connecting air and power cylinders in pairs in which the air piston ends its compressing stroke during the power stroke in the power cylinder to which it is connected; means to introduce the fuel for each power cylinder into its said passage; and a valve in said passage between the fuel inlet and the air cylinder; the whole being arranged and adapted to force the main charge of air for each cycle through said passage during progressive combustion and flow toward and into said power cylinder and while the power piston therein is closed to its head end of stroke.

20. In an internal combustion engine, the combination of a crank shaft, and three pistons connected thereto at equiangular distances apart; cylinders for them closed at opposite ends and having valves whereby one end constitutes a power cylinder and the other end an air compressing cylinder both of which are served by the same one of said pistons; passages, connecting air and power cylinders in pairs in which the air piston ends its compressing stroke during the power stroke in the power cylinder to which it is connected; means to introduce the fuel for each power cylinder into its said passage; a valve in said passage between the fuel inlet and the air cylinder; the whole being arranged and adapted to force the main charge of air for each cycle through said passage during progressive combustion and flow toward and into said power cylinder and while the power piston therein is close to its head end of stroke; and auxiliary means to maintain a supply of air at low pressure, from which the inlets of the air cylinders are fed.

21. In an internal combustion engine the combination of a power cylinder and piston; an air cylinder; with piston lagging behind the power piston; a passage thence to the power cylinder; means therein for mixture and combustion of the main charge of air and fuel to occur progressively with flow toward and into said power cylinder; and a piston pump delivering at a low pressure to the inlet of the air cylinder, comprising a cylinder with double acting piston and means whereby this cylinder can be opened at one end to provide free communication with the atmosphere.

22. In an internal combustion engine, the combination of a power cylinder and piston; an air cylinder, with piston lagging behind the power piston and arranged with an air outlet at a distance from the head of the power cylinder; a passage thence to the power cylinder; a valve therein located at a distance from the air cylinder and relatively close to the power cylinder, dividing the passage into air and mixing portions and adapted to regulate flow from the air portion into the mixing portion; and means to introduce atomized fuel to said mixing portion; said mixing portion being a part of the power cylinder clearance wherein occurs combustion of the main charge progressively with flow toward and into the power cylinder; the earlier portion of said combustion occurring while the pressure is relatively low as compared with the maximum pressure of each cycle; there being means to surround said air portion with exhaust gases whereby the temperature of air that is initially to pass thence into the mixing portion for vaporizing fuel is increased above that due to its mechanical compression alone.

23. In an internal combustion engine the combination of a power cylinder and piston; a mixing and combustion passage leading into the head of said cylinder and forming part of the clearance thereof; an exhaust valve in said cylinder which is open in each cycle until said piston has nearly reached the end of its stroke toward said cylinder head, whereby the pressure in the clearance at the end of stroke would be relatively low as compared with the maximum pressure of each cycle; means to introduce the main charges of air and fuel into said passage gradually with progressive combustion during flow toward and into said cylinder, the early portion of said combustion occuring while the pressure is relatively low as aforesaid, the combustion thereof being sufficient to raise the pressure to approximately said maximum pressure without material movement of said piston; and means to protect the walls consisting of the construction of the parts with space in the clearance providing distance for the burning fuel to flow and substantially to complete its combustion, and to expand laterally from the place where combustion begins, thereby reducing the degree of impingement upon the confining walls.

24. In an internal combustion engine the combination of a power cylinder and piston; a mixing and combustion passage leading into the head end of said cylinder and forming part of clearance thereof; an exhaust valve in said cylinder which is open in each cycle until said piston has nearly reached the end of its stroke toward said cylinder head, whereby the pressure in the clearance at the end of stroke would be relatively low as compared with the maximum pressure of each cycle, means to force the main charge of compressed air through said passage; means to project atomized fuel in said passage into said air and across the direction of its flow; a device whereby the fuel is ignited within said passage while pressure is relatively low as aforesaid, combustion occurring progressively with flow toward and into said cylinder with the early combustion sufficient to raise the pressure to approximately said maximum pressure without material movement of said piston; and the walls of said passage being constructed with small cross section of passage at the place of fuel projection, and with length providing distance for the burning fuel to flow and substantially to complete its combustion, and with diverging walls permitting the gases to expand laterally during flow, thereby diminishing the intensity of impact of hot gases upon the confining walls.

25. In an internal combustion engine the combination of a plurality of power cylinders and pistons, air cylinders with pistons mechanically connected to the power pistons, and passages connecting air and power cylinders in pairs in which the air piston ends its compressing stroke during the power stroke in the power cylinder to which it is connected; means to introduce the fuel for each power cylinder into its said passage; the whole being arranged and adapted to force the main charges of air and fuel for each cycle through said passage during progressive combustion and flow toward and into said power cylinder while the power piston therein is close to its head end of stroke; there being a valve, to which a plurality of said passages from air cylinders extend and from which a plurality of said passages to power cylinders extend, adapted to change the connection from one air cylinder to a different power cylinder whereby the timing of air delivery is made suitable for running the engine in the opposite direction.

26. In an internal combustion engine the combination of three power cylinders with pistons, air cylinders with pistons mechanically connected to the power pistons, and passages connecting air and power cylinders in pairs in which the air piston ends its compressing stroke during the power stroke in the power cylinder to which it is connected; means to introduce the fuel for each power cylinder into its said passage; the whole being arranged and adapted to force the main charges of air and fuel for each cycle through said passage during progressive combustion and flow toward and into said power cylinder while the power piston therein is close to its head end of stroke; there being a single valve, to which three of said passages from air cylinders extend and from which three of said passages to power cylinders extend, adapted to change the connection from each air cylinder to a different power cylinder whereby the timing of air delivery is made suitable for running the engine in opposite direction.

27. In an internal combustion engine the combination of a crank shaft and three pistons connected thereto at equiangular distances apart; cylinders for them closed at opposite ends and severally having valves whereby one end constitutes a power cylinder and the other end an air compressing cylinder both of which are served by the same one of said pistons; passages, connecting air and power cylinders in pairs in which the air piston ends its compressing stroke during the power stroke in the power cylinder to which it is connected; means to introduce the fuel for each power cylinder into its said passage; a valve in said passage between the fuel inlet and the air cylinder; the whole being arranged and adapted to force the main charge of air for each cycle through said passage during progressive combustion and flow toward and into said power cylinder and while the power piston therein is close to its head end of stroke, there being another valve intervening in all of said passages on the air cylinder side of the first mentioned valves, adapted to change the connection from one air cylinder to a different power cylinder whereby the timing of air delivery is made suitable for running the engine in opposite direction, and having six ports for said passages 60° apart, and three ways in its moving part, adapted to register with said ports, one of said ways connecting ports 180° apart, and the other two each connecting ports 120° apart on the same side of the first mentioned way.

28. In an internal combustion engine the combination of a plurality of power cylinders and pistons, air cylinders with pistons mechanically connected to the power pistons, and passages connecting air and power cylinders in pairs in which the air piston ends it compressing stroke during the power stroke in the power cylinder to which it is connected; means to introduce the fuel for each power cylinder into its said passage; the whole being arranged and adapted to force the main charges of air and fuel for each cycle through said passage during progressive combustion and flow toward and into said power cylinder while the power piston therein is close to its head end of stroke; there being a valve, to which a plurality of said passages from air cylinders extend and from which a plurality of said passages to power cylinders extend, adapted to change the connection from one air cylinder to a different power cylinder whereby the timing of air delivery is made suitable for running the engine in opposite direction, said passages all having ports in the same plane, and the movable part of the valve having separate ways extending across each other by curvature out of said plane.

29. In an internal combustion engine the combination of a plurality of power cylinders and pistons, air cylinders with pistons mechanically connected to the power pistons, and passages connecting air and power cylinders in pairs in which the air piston ends its compressing stroke during the power stroke in the power cylinder to which it is connected; means to introduce the fuel for each power cylinder into its said passage; the whole being arranged and adapted to force the main charges of air and fuel for each cycle through said passage during progressive combustion and flow toward and into said power cylinder while the power piston therein is close to its head end of stroke; each whole passage having at least three parts, comprising one from air cylinder, one to power cylinder, and one a movable intervening section that can be diversely connected, whereby the timing of air delivery is made suitable for running the engine in opposite direction.

30. In an internal combustion engine including in combination a power cylinder and an air cylinder connected by a passage, pistons in the cylinders operatively connected so that the air piston ends its compressing stroke during the earlier part of the power stroke of the power piston; means to introduce fuel into said passage, a device for igniting fuel within said passage, a valve in said passage separating the fuel inlet and combustion portion from the air cylinder, said portion being part of the clearance of the power cylinder, the whole being arranged and adapted to force the main charge of air for each cycle through said passage during progressive combustion and flow toward and into the power cylinder; means to supply air at low pressure to the air cylinder, means closing said valve before said air piston reaches its head end of stroke, and the confining walls between said air piston and said valve being arranged to inclose a relatively large clearance space, whereby the proportionate increase in pressure is small as said air piston reaches its head end of stroke.

31. In an internal combustion engine the combination of a crank shaft, a plurality of power pistons connected thereto; cylinders for these pistons; an air cylinder and connecting passage for each power cylinder; means to introduce the charge of fuel for each power cylinder into its said passage; a check valve between the fuel inlet and the air cylinder; and pistons for the air cylinders; one of the air pistons being connected to a crank to which is connected a different power piston from that to whose cylinder is connected the air cylinder in which said air piston is; the whole being arranged with air pistons lagging behind the pistons in the power cylinders to which their cylinders are connected, and adapted to force a main charge of compressed air for each power cylinder through its said passage during progressive combustion and flow toward and into said power cylinder and while the power piston therein is close to its head end of stroke; means to supply air at low pressure to the air cylinder, means closing said valve before said air piston reaches its head end of stroke, and the confining walls between said air piston and said valve being arranged to inclose a relatively large clearance space, whereby the proportionate increase in pressure is small as said air piston reaches its head end of stroke.

32. In an internal combustion engine the combination of a crank shaft, a plurality of air and power pistons connected thereto and cylinders therefor, there being one piston of each kind connected to a single crank; passages between air and power cylinders, connecting them in pairs in which the air piston ends its compressing stroke during the power stroke in the power cylinder to which it is connected; means to divide each said passage, one portion receiving air freely from the air cylinder and delivering intermittently to the other portion; means to project fuel in finely divided form through air in said other portion; said portion having diverging walls between which combustion occurs progressively with flow toward and into the power cylinder while the power piston therein is close to its cylinder head.

Signed by me at Boston, Mass., this twentieth day of March, 1916.

MERL R. WOLFARD.

Witnesses:
JOSEPH T. BRENNAN,
EVERETT E. KENT.